(12) United States Patent
Morton et al.

(10) Patent No.: US 12,397,924 B2
(45) Date of Patent: Aug. 26, 2025

(54) OPEN ROTOR AIRCRAFT PROPULSION SYSTEM WITH BYPASS FLOWPATH

(71) Applicant: RTX Corporation, Farmington, CT (US)

(72) Inventors: Jeffrey T. Morton, Manchester, CT (US); Andrew E. Breault, Bolton, CT (US); Jon Erik Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/431,082

(22) Filed: Feb. 2, 2024

(65) Prior Publication Data

US 2025/0250020 A1    Aug. 7, 2025

(51) Int. Cl.
| | |
|---|---|
| *F02C 3/06* | (2006.01) |
| *B64C 11/48* | (2006.01) |
| *B64D 27/10* | (2006.01) |
| *B64D 33/08* | (2006.01) |
| *F02C 6/20* | (2006.01) |

(52) U.S. Cl.
CPC .............. *B64D 33/08* (2013.01); *B64C 11/48* (2013.01); *B64D 27/10* (2013.01); *F02C 3/06* (2013.01); *F02C 6/206* (2013.01)

(58) Field of Classification Search
CPC . F02K 3/065; F02K 3/06; F02K 3/062; F02K 3/077
See application file for complete search history.

(56) References Cited

U.S. PATENT DOCUMENTS

| | | | |
|---|---|---|---|
| 4,765,135 A | 8/1988 | Lardellier | |
| 6,041,589 A * | 3/2000 | Giffin, III | F02K 3/075 60/226.3 |
| 7,891,163 B2 | 2/2011 | Richards | |
| 8,720,208 B2 | 5/2014 | Negulescu | |
| 9,869,248 B2 | 1/2018 | Suciu | |

(Continued)

FOREIGN PATENT DOCUMENTS

| | | |
|---|---|---|
| DE | 102015209148 A1 | 10/2016 |
| WO | 2023198963 A1 | 10/2023 |

OTHER PUBLICATIONS

EP Search Report for EP Patent Application No. 25155664.3 dated Jun. 4, 2025.

*Primary Examiner* — Thuyhang N Nguyen
(74) *Attorney, Agent, or Firm* — Getz Balich LLC

(57) ABSTRACT

A propulsion system for an aircraft includes an open propulsor rotor and a turbine engine configured to drive rotation of the open propulsor rotor about an axis. The turbine engine includes a core flowpath, a bypass flowpath, a fan section and an engine core. The engine core includes a compressor section, a combustor section and a turbine section. The core flowpath extends through the compressor section, the combustor section and the turbine section from an inlet into the core flowpath to an exhaust from the core flowpath. The inlet is next to and downstream of the fan section. The bypass flowpath extends outside of and along the engine core from an inlet into the bypass flowpath to an exhaust from the bypass flowpath. The inlet is next to and downstream of the fan section. The engine core is arranged axially between the fan section and the open propulsor rotor.

19 Claims, 6 Drawing Sheets

(56) References Cited

U.S. PATENT DOCUMENTS

| | | | |
|---|---|---|---|
| 2011/0268563 A1* | 11/2011 | Stretton | F02K 3/072 |
| | | | 415/179 |
| 2011/0274547 A1* | 11/2011 | Morgan | B64C 11/325 |
| | | | 416/157 R |
| 2014/0119903 A1 | 5/2014 | Suciu | |
| 2018/0128183 A1* | 5/2018 | Escure | B64D 35/06 |
| 2018/0216525 A1* | 8/2018 | Plante | F02C 7/36 |
| 2021/0108597 A1 | 4/2021 | Marion | |
| 2023/0085244 A1* | 3/2023 | Miller | B64D 33/02 |
| | | | 415/68 |

* cited by examiner

OPEN ROTOR AIRCRAFT PROPULSION SYSTEM WITH BYPASS FLOWPATH

BACKGROUND OF THE DISCLOSURE

1. Technical Field

This disclosure relates generally to an aircraft and, more particularly, to a propulsion system for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, a propulsion system is provided for an aircraft. This aircraft propulsion system includes an open propulsor rotor and a turbine engine configured to drive rotation of the open propulsor rotor about an axis. The turbine engine includes a core flowpath, a bypass flowpath, a fan section and an engine core. The engine core includes a compressor section, a combustor section and a turbine section. The core flowpath extends through the compressor section, the combustor section and the turbine section from an inlet into the core flowpath to an exhaust from the core flowpath. The inlet into the core flowpath is next to and downstream of the fan section. The bypass flowpath extends outside of and along the engine core from an inlet into the bypass flowpath to an exhaust from the bypass flowpath. The inlet into the bypass flowpath is next to and downstream of the fan section. The engine core is arranged axially between the fan section and the open propulsor rotor.

According to another aspect of the present disclosure, another propulsion system is provided for an aircraft. This aircraft propulsion system includes an open propulsor rotor and a turbine engine configured to drive rotation of the open propulsor rotor about an axis. The turbine engine includes a core flowpath, a bypass flowpath, a fan section and an engine core. The engine core includes a compressor section, a combustor section and a turbine section. The core flowpath extends, in an axial direction towards the open propulsor rotor, through the compressor section, the combustor section and the turbine section from an inlet into the core flowpath to an exhaust from the core flowpath. The inlet into the core flowpath is downstream of the fan section. The bypass flowpath extends, in the axial direction towards the open propulsor rotor, from an inlet into the bypass flowpath to an exhaust from the bypass flowpath. The inlet into the bypass flowpath is downstream of the fan section.

According to still another aspect of the present disclosure, another propulsion system is provided for an aircraft. This aircraft propulsion system includes an open propulsor rotor and a turbine engine configured to drive rotation of the open propulsor rotor about an axis. The turbine engine includes a core flowpath, a bypass flowpath, an exhaust flowpath, a fan section and an engine core. The engine core includes a compressor section, a combustor section and a turbine section. The core flowpath extends through the compressor section, the combustor section and the turbine section from an inlet into the core flowpath to an exhaust from the core flowpath. The inlet into the core flowpath is downstream of the fan section. The bypass flowpath extends from an inlet into the bypass flowpath to an exhaust from the bypass flowpath. The inlet into the bypass flowpath is downstream of the fan section. The exhaust flowpath fluidly couples the core flowpath and the bypass flowpath to an exhaust from the turbine engine.

The bypass flowpath may extend from the inlet into the bypass flowpath to the exhaust from the bypass flowpath in a direction axially towards the open propulsor rotor.

The inlet into the bypass flowpath may be radially outboard of the inlet into the core flowpath.

The inlet into the core flowpath and the inlet into the bypass flowpath may each be configured as an annular inlet.

The bypass flowpath may include an upstream section and a downstream section. The upstream section may be annular. The downstream section may be non-annular.

The aircraft propulsion system may include a heat exchanger disposed in the downstream section.

The downstream section may be a first downstream section, and the bypass flowpath may also include a second downstream section. The second downstream section may be non-annular. The first downstream section and the second downstream section may be fluidly coupled in parallel to the upstream section.

The aircraft propulsion system may include a first heat exchanger and a second heat exchanger. The first heat exchanger may be arranged with the first downstream section. The second heat exchanger may be arranged with the second downstream section.

The turbine engine may also include an inlet flowpath fluidly coupling an inlet into the turbine engine to the core flowpath and the bypass flowpath. The inlet flowpath may axially reverse direction between the inlet into the turbine engine and the fan section.

The turbine engine may also include an exhaust flowpath fluidly coupling the core flowpath and the bypass flowpath to an exhaust from the turbine engine. The exhaust flowpath may axially reverse direction between the engine core and the exhaust from the turbine engine.

The turbine section may include a free power turbine rotor. The free power turbine rotor may be coupled to and configured to drive the rotation of the open propulsor rotor.

The aircraft propulsion system may also include a geartrain coupling the free power turbine rotor to the open propulsor rotor.

The free power turbine rotor may be rotatable about the axis.

The axis may be a first axis, and the free power turbine rotor may be rotatable about a second axis that is offset from the first axis.

The engine core may include a rotating assembly rotatable about the axis. The rotating assembly may include a compressor rotor, a turbine rotor and a shaft coupling the turbine rotor to the compressor rotor. The compressor rotor may be in the compressor section. The turbine rotor may be in the turbine section.

The axis may be a first axis. The engine core may include a rotating assembly rotatable about a second axis offset from the first axis. The rotating assembly may include a compressor rotor, a turbine rotor and a shaft coupling the turbine rotor to the compressor rotor. The compressor rotor may be in the compressor section. The turbine rotor may be in the turbine section.

The aircraft propulsion system may also include an open guide vane structure downstream of the open propulsor rotor. The open guide vane structure may be configured to condition air propelled by the open propulsor rotor.

The aircraft propulsion system may also include a second open propulsor rotor. The turbine engine may be configured to drive rotation of the second open propulsor rotor about the axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
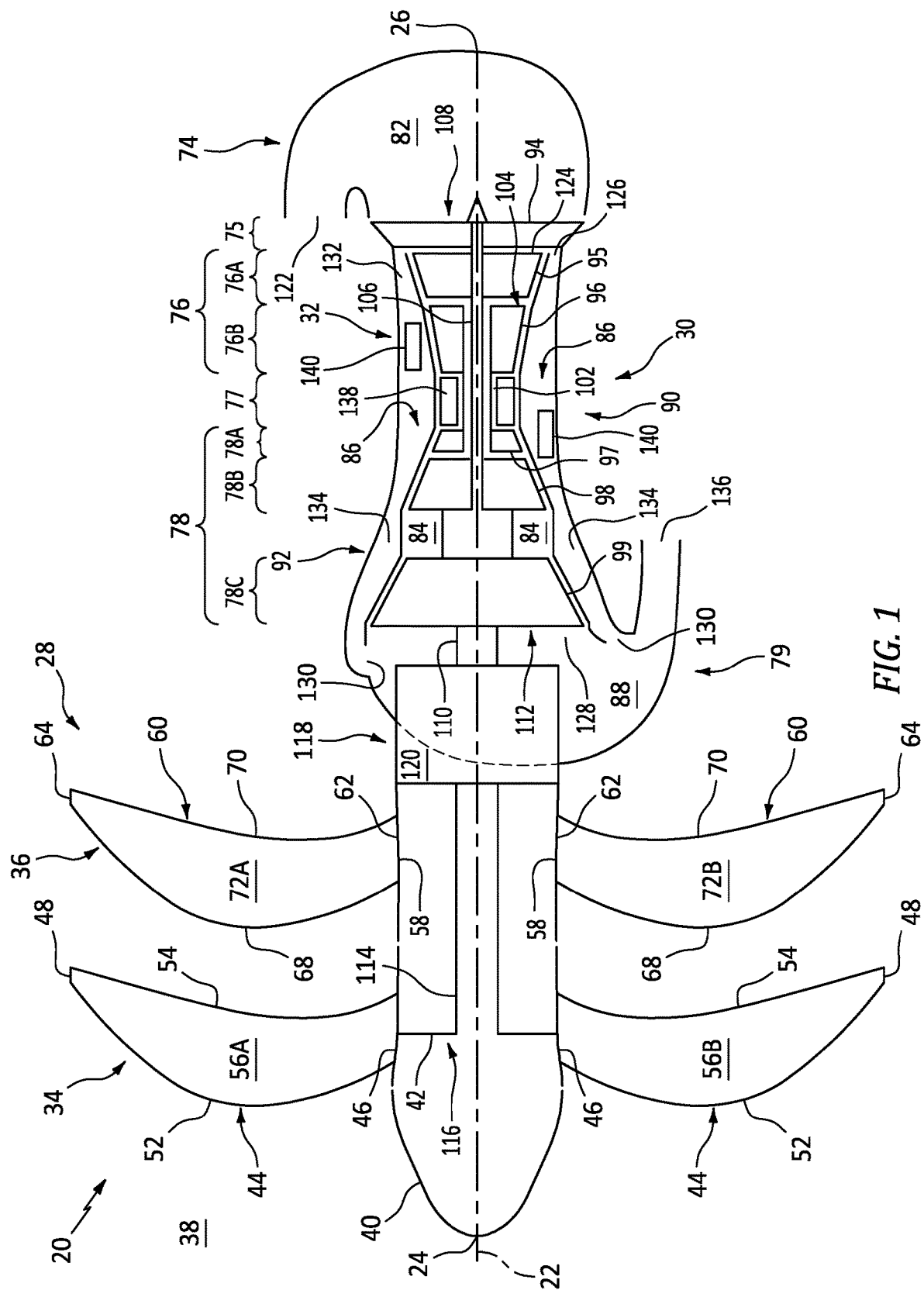
FIG. 1 is a sectional schematic illustration of a propulsion system for an aircraft.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 is configured as an open rotor propulsion system. The aircraft propulsion system 20 of FIG. 1, for example, extends axially along an axis 22 between an upstream, forward end 24 of the aircraft propulsion system 20 and a downstream, aft end 26 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20. The aircraft propulsion system 20 of FIG. 1 includes a propulsion module 28, a turbine engine 30 and a heat exchange system 32.

The propulsion module 28 of FIG. 1 includes an open propulsor rotor 34 and an open guide vane structure 36. Here, the term "open" may describe a propulsion system section and/or a propulsion system component which is open to an environment 38 (e.g., an ambient environment) external to the aircraft propulsion system 20 and its propulsion module 28. The propulsion module members 34 and 36 of FIG. 1, for example, are un-ducted and unshrouded components of the aircraft propulsion system 20 and its propulsion module 28. The propulsion module 28 of FIG. 1 also includes a nose cone 40 disposed at (e.g., on, adjacent or proximate) the propulsion system forward end 24. This nose cone 40 may be configured as a spinner which is rotatable with the propulsor rotor 34 about the axis 22. Alternatively, the nose cone 40 may be configured as a stationary structure of the propulsion module 28.

The propulsor rotor 34 includes a rotor base 42 (e.g., a disk or a hub) and a plurality of open propulsor blades 44 (e.g., airfoils). The propulsor blades 44 are arranged circumferentially around the rotor base 42 and the axis 22 in an array; e.g., a circular array. Each of the propulsor blades 44 is connected to (e.g., formed integral with or otherwise attached to) the rotor base 42.

Figure 2:
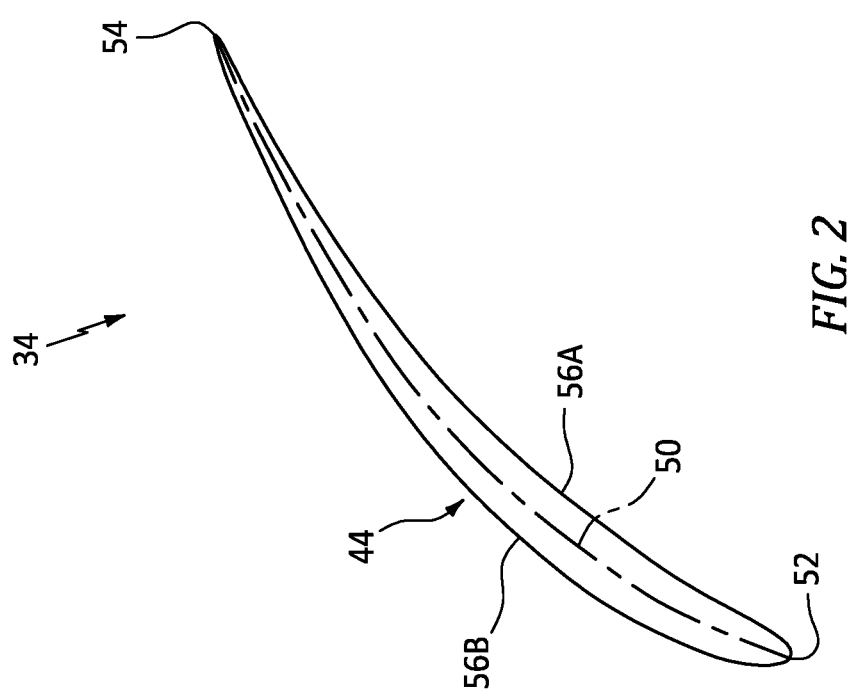
FIG. 2 is a cross-sectional illustration of an open propulsor blade.

Each propulsor blade 44 projects spanwise along a span line of the respective propulsor blade 44 (e.g., radially relative to the axis 22) out from an exterior surface 46 of the rotor base 42, into the external environment 38, to an unshrouded, distal tip 48 of the respective propulsor blade 44. Each propulsor blade 44 is thereby configured as an un-ducted and unshrouded propulsor blade which is exposed to (e.g., disposed in) the surrounding external environment 38. Referring to FIG. 2, each propulsor blade 44 extends longitudinally along a mean line 50 (e.g., a camber line) of the respective propulsor blade 44 from a leading edge 52 of the respective propulsor blade 44 to a trailing edge 54 of the respective propulsor blade 44. Each propulsor blade 44 extends laterally between and to opposing side exterior surfaces 56A and 56B (generally referred to as "56") of the respective propulsor blade 44. The first blade exterior surface 56A may be a concave, pressure side surface of the respective propulsor blade 44. The second blade exterior surface 56B may be a convex, suction side surface of the respective propulsor blade 44. Each of these blade exterior surfaces 56 extends longitudinally along the blade mean line 50 between and meet at the respective blade leading edge 52 and the respective blade trailing edge 54. Referring to FIG. 1, each blade element 52, 54, 56A, 56B extends spanwise from the base exterior surface 46 to the respective blade tip 48.

Each propulsor blade 44 may be configured as a fixed propulsor blade. Each propulsor blade 44, for example, may be fixedly connected to the rotor base 42. Alternatively, some or all of the propulsor blades 44 may each be configured as a variable propulsor blade. Each propulsor blade 44, for example, may be pivotally coupled to the rotor base 42 so as to be operable to change, for example, a pitch of the respective propulsor blade 44.

The propulsor rotor 34 of FIG. 1 is arranged axially along the axis 22 between the nose cone 40 and the guide vane structure 36. The propulsor rotor 34 of FIG. 1, in particular, is arranged axially downstream, aft of the nose cone 40 and axially upstream, forward of the guide vane structure 36. An upstream, forward end of the propulsor rotor 34 may be disposed axially next to (e.g., adjacent, slightly spaced from) a downstream, aft end of the nose cone 40. A downstream, aft end of the propulsor rotor 34 may be disposed axially next to an upstream, forward end of the guide vane structure 36.

The guide vane structure 36 includes an inner platform 58 and a plurality of open guide vanes 60; e.g., airfoils. The guide vanes 60 are arranged circumferentially around the inner platform 58 and the axis 22 in an array; e.g., a circular array. Each of the guide vanes 60 is connected to the inner platform 58.

Figure 3:
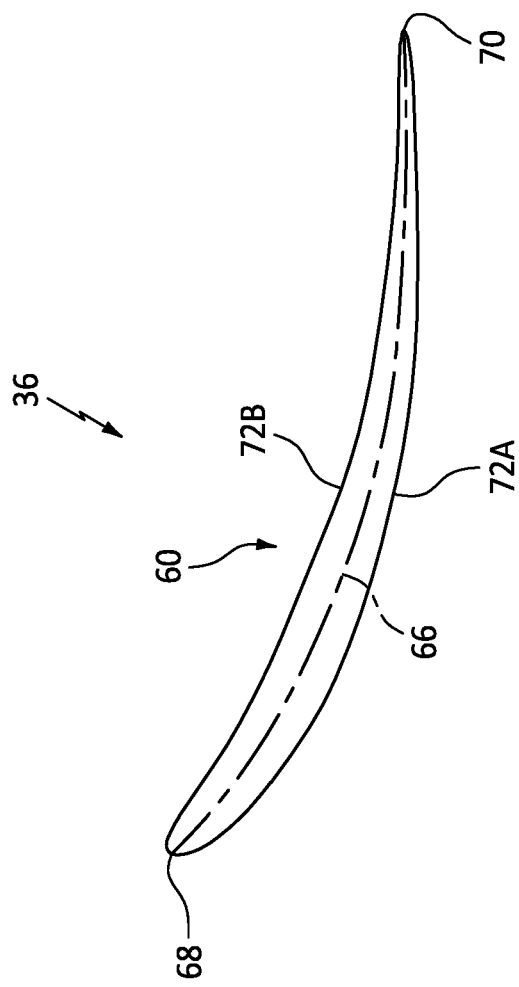
FIG. 3 is a cross-sectional illustration of an open guide vane.

Each guide vane 60 projects spanwise along a span line of the respective guide vane 60 (e.g., radially relative to the axis 22) out from an exterior surface 62 of the inner platform 58, into the external environment 38, to an unshrouded, distal tip 64 of the respective guide vane 60. Each guide vane 60 is thereby configured as an un-ducted and unshrouded guide vane which is exposed to (e.g., disposed in) the surrounding external environment 38. Referring to FIG. 3, each guide vane 60 extends longitudinally along a mean line 66 (e.g., a camber line) of the respective guide vane 60 from a leading edge 68 of the respective guide vane 60 to a trailing edge 70 of the respective guide vane 60. Each guide vane 60 extends laterally between and to opposing side exterior surfaces 72A and 72B (generally referred to as "72") of the respective guide vane 60. The first vane exterior surface 72A may be a convex, suction side surface of the respective guide vane 60. The second vane exterior surface 72B may be a concave, pressure side surface of the respective guide vane 60. Each of these vane exterior surfaces 72 extends longitudinally along the vane mean line 66 between (and meet at) the respective vane leading edge 68 and the respective vane trailing edge 70. Referring to FIG. 1, each vane element 68, 70, 72A, 72B extends spanwise from the platform exterior surface 62 to the respective vane tip 64.

Each guide vane 60 may be configured as a fixed guide vane. Each guide vane 60, for example, may be fixedly connected to the inner platform 58 and/or an internal support structure covered by the inner platform 58. Alternatively, some or all of the guide vanes 60 may each be configured as a variable guide vane. Each guide vane 60, for example, may be pivotally and/or otherwise moveably coupled to the inner platform 58 and/or the internal support structure covered by the inner platform 58 so as to be operable to change, for example, a pitch of the respective guide vane 60.

The guide vane structure 36 of FIG. 1 is arranged axially between the propulsor rotor 34 and one or more sections of the turbine engine 30, or an entirety of the turbine engine 30. The guide vane structure 36 of FIG. 1, in particular, is arranged axially downstream, aft of the propulsor rotor 34 and axially forward of the turbine engine 30 and its engine sections. An aft end of the guide vane structure 36 may be disposed axially next to an upstream, forward end of the turbine engine 30; e.g., relative to fluid flow within the external environment 38 outside of the aircraft propulsion system 20 and its turbine engine 30.

The turbine engine 30 of FIG. 1 includes an inlet section 74, a fan section 75, a compressor section 76, a combustor section 77, a turbine section 78 and an exhaust section 79. This turbine engine 30 also includes an inlet flowpath 82, a (e.g., annular) core flowpath 84, a bypass flowpath 86 and an exhaust flowpath 88.

The compressor section 76 of FIG. 1 includes a low pressure compressor (LPC) section 76A and a high pressure compressor (HPC) section 76B. The turbine section 78 of FIG. 1 includes a high pressure turbine (HPT) section 78A, an intermediate pressure turbine (IPT) section 78B and a power turbine (PT) section 78C, which PT section 78C is a low pressure turbine (LPT) section of the aircraft propulsion system 20 and its turbine engine 30. At least (or only) the LPC section 76A, the HPC section 76B, the combustor section 77, the HPT section 78A, the IPT section 78B and the PT section 78C may collectively form a core 90 of the turbine engine 30; e.g., a gas generator.

The engine sections 74, 75, 76A, 76B, 77, 78A, 78B, 78C and 79 may be arranged sequentially along the axis 22 between the propulsion system aft end 26 and the propulsion system forward end 24. With this arrangement, each engine section 78A, 78B, 78C and 79 is arranged axially along the axis 22 between (A) the propulsion module 28 and its components 34 and 36 and (B) the combustor section 77. The exhaust section 79 of FIG. 1 is also arranged axially along the axis 22 between (A) the propulsion module 28 and its components 34 and 36 and (B) the turbine section 78 and each of its sub-sections 78A-C. The engine sections 75, 76A, 76B, 77, 78A, 78B and 78C of FIG. 1 are arranged within an engine housing 92; e.g., a case and a nacelle. The propulsor rotor 34 and the guide vane structure 36 are arranged outside of the engine housing 92.

Each of the engine sections 75, 76A, 76B, 78A, 78B and 78C includes a respective bladed rotor 94-99; e.g., a ducted and/or shrouded engine rotor. Each of these engine rotors 94-99 includes a rotor base (e.g., a disk or a hub) and a plurality of rotor blades (e.g., airfoils, vanes, etc.). The rotor blades are arranged circumferentially around the respective rotor base and the axis 22 in an array. The rotor blades may also be arranged into one or more stages longitudinally along the core flowpath 84. Each of the rotor blades is connected to the respective rotor base. Each of the rotor blades projects radially (e.g., spanwise) out from the respective rotor base into the core flowpath 84 and to a distal tip of the respective rotor blade.

The HPC rotor 96 is coupled to and rotatable with the HPT rotor 97. The HPC rotor 96 of FIG. 1, for example, is connected to the HPT rotor 97 by a high speed shaft 102. At least (or only) the HPC rotor 96, the HPT rotor 97 and the high speed shaft 102 collectively form a high speed rotating assembly 104; e.g., a high speed spool of the turbine engine 30 and its engine core 90.

The fan rotor 94 and the LPC rotor 95 are coupled to and rotatable with the IPT rotor 98. The fan rotor 94 and the LPC rotor 95 of FIG. 1, for example, are connected to the IPT rotor 98 by a low speed shaft 106. At least (or only) the fan rotor 94, the LPC rotor 95, the IPT rotor 98 and the low speed shaft 106 collectively form a low speed rotating assembly 108; e.g., a low speed spool of the turbine engine 30 and its engine core 90.

The PT rotor 99 (e.g., the LPT rotor) is connected to and rotatable with a power turbine shaft 110. At least (or only) the PT rotor 99 and the power turbine shaft 110 collectively form a power turbine rotating assembly 112.

The propulsor rotor 34 is connected to and rotatable with a propulsor shaft 114. At least (or only) the propulsor rotor 34 and the propulsor shaft 114 collectively form a propulsor rotating assembly 116. This propulsor rotating assembly 116 is coupled to the power turbine rotating assembly 112 through a drivetrain 118. The drivetrain 118 may be configured as a geared drivetrain, where a geartrain 120 (e.g., a transmission, a speed change device, an epicyclic geartrain, etc.) is disposed between and operatively couples the propulsor rotating assembly 116 and its propulsor shaft 114 to the power turbine rotating assembly 112 and its power turbine shaft 110. With this arrangement, the propulsor rotor 34 may rotate at a different (e.g., slower) rotational velocity than the power turbine rotating assembly 112 and its PT rotor 99. However, the drivetrain 118 may alternatively be configured as a direct drive drivetrain, where the geartrain 120 is omitted. With this arrangement, the propulsor rotor 34 and the PT rotor 99 may rotate at a common (the same) rotational velocity. Referring again to FIG. 1, each of the rotating assemblies 104, 108, 112 and 116 and its members may be rotatable about the axis 22.

The inlet flowpath 82 fluidly couples an airflow inlet 122 into the turbine engine 30 from the exterior environment 38 to the core flowpath 84 and the bypass flowpath 86. The inlet flowpath 82 of FIG. 1, for example, extends longitudinally from the engine inlet 122, through the fan section 75, to an airflow inlet 124 into the core flowpath 84 and an airflow inlet 126 into the bypass flowpath 86. Between the engine inlet 122 and the fan section 75, the inlet flowpath 82 may axially reverse its direction. An upstream section of the inlet flowpath 82 of FIG. 1, for example, projects axially in an axial aft direction (e.g., left-to-right in FIG. 1) into the turbine engine 30 from the engine inlet 122. The inlet flowpath 82 then turns radially inwards and reverses direction such that a downstream section of the inlet flowpath 82 extends axially in an axial forward direction (e.g., right-to-left in FIG. 1) to the fan section 75. This downstream section of the inlet flowpath 82 may also extend axially through the fan section 75 to the core inlet 124 and the bypass inlet 126.

The core flowpath 84 extends longitudinally, in the axial forward direction towards the propulsion module 28 and its propulsor rotor 34, through the engine core 90 from the inlet flowpath 82 to a core exhaust 128 from the core flowpath 84. The core flowpath 84 of FIG. 1, for example, extends sequentially through the LPC section 76A, the HPC section 76B, the combustor section 77, the HPT section 78A, the IPT section 78B and the PT section 78C from the core inlet 124 to the core exhaust 128. The core inlet 124 of FIG. 1 is located downstream of and may be longitudinally/axially next to the fan section 75 and its fan rotor 94. The core exhaust 128 of FIG. 1 is located downstream of and may be longitudinally/axially next to the PT section 78C and its PT rotor 99. The core inlet 124 and the core exhaust 128 may each be annular.

The bypass flowpath 86 extends longitudinally, in the axial forward direction towards the propulsion module 28 and its propulsor rotor 34, outside of the engine core 90 and its engine sections 76A-78C from the bypass inlet 126 to one or more bypass exhausts 130 from the bypass flowpath 86. The bypass flowpath 86 of FIG. 1, for example, is disposed radially outboard of and extends axially along (e.g., axially overlaps) the engine core 90 from the bypass inlet 126 to the bypass exhausts 130. The bypass inlet 126 of FIG. 1 is located downstream of and may be longitudinally/axially next to the fan section 75 and its fan rotor 94. This bypass inlet 126 is disposed radially outboard of and may circumscribe the core inlet 124 where, for example, the bypass inlet 126 is annular. Each bypass exhaust 130 of FIG. 1 is located axially forward of the engine core 90 and its PT section 78C. Each bypass exhaust 130 may be non-annular.

Figure 4:
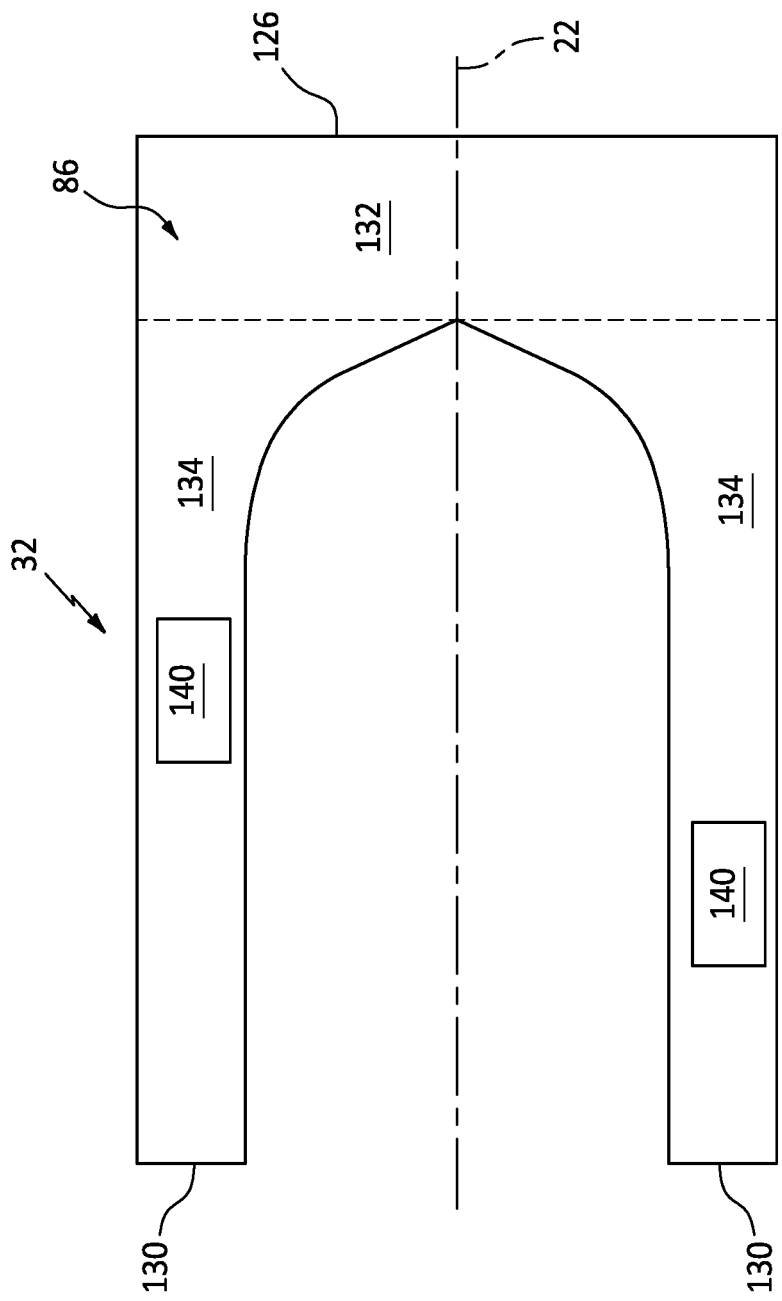
FIG. 4 is a schematic plan view illustration of a bypass flowpath arranged with heat exchangers.

Referring to FIG. 4, the bypass flowpath 86 may include a flowpath feed 132 and one or more flowpath legs 134. The flowpath feed 132 forms an upstream section of the bypass flowpath 86 which feeds (e.g., directs air into) the flowpath legs 134. The flowpath feed 132 of FIG. 4, for example, extends longitudinally from the bypass inlet 126 to each of the flowpath legs 134. Referring to FIG. 1, the flowpath feed 132 may be annular and extend axially along and circumscribe the engine core 90 and its LPC section 76A. The flowpath legs 134 form (e.g., parallel) downstream sections of the bypass flowpath 86 which laterally split off from the flowpath feed 132; see also FIG. 4. The flowpath legs 134 are disposed circumferentially about the engine core 90 and the axis 22. Each flowpath leg 134 of FIG. 1, for example, extends longitudinally from the flowpath feed 132 to its respective bypass exhaust 130. Each flowpath leg 134 may be non-annular (e.g., arcuate, etc.) and extend axially along the engine core 90 and its engine sections 76B-78C. It is contemplated, however, the bypass flowpath 86 may alternatively include a single annular downstream section which replaces the one or more (e.g., non-annular) flowpath legs 134.

The exhaust flowpath 88 fluidly couples the core flowpath 84 and the bypass flowpath 86 to an exhaust 136 from the turbine engine 30 into the exterior environment 38. The exhaust flowpath 88 of FIG. 1, for example, extends longitudinally from the engine core 90 at the core exhaust 128 to the engine exhaust 136. The bypass exhausts 130 may be arranged longitudinally along the exhaust flowpath 88 at or (e.g., slightly) downstream of the core exhaust 128. Between the engine core 90 and the engine exhaust 136, the exhaust flowpath 88 may axially reverse its direction. An upstream section of the exhaust flowpath 88 of FIG. 1, for example, extends axially in the axial forward direction away from the engine core 90. The exhaust flowpath 88 then turns radially outwards and reverses direction such that a downstream section of the exhaust flowpath 88 extends axially in the axial aft direction to the engine exhaust 136.

With the foregoing arrangement, the core flowpath 84 and the bypass flowpath 86 are fluidly coupled in parallel between the inlet flowpath 82 and the exhaust flowpath 88. The engine inlet 122 is located axially aft of the engine exhaust 136. The engine inlet 122 and the engine exhaust 136 may be located to different (e.g., opposing) sides of the turbine engine 30. In addition or alternatively, while the engine inlet 122 is shown in FIG. 1 as being axially aft of the engine exhaust 136, it is contemplated additional ducting may be included for the engine inlet 122 and/or for the engine exhaust 136 to locate the engine inlet 122 axially forward of the engine exhaust 136.

During operation of the aircraft propulsion system 20, ambient air within the external environment 38 is propelled by the propulsor rotor 34 across the guide vane structure 36 in an aft, downstream direction towards the propulsion system aft end 26. The guide vane structure 36 and its guide vanes 60 condition (e.g., straighten out) the air propelled by the propulsor rotor 34, for example, to remove or reduce circumferential swirl. A major outer portion of the air propelled by the propulsor rotor 34 across the guide vane structure 36 provides forward thrust. A minor inner portion of the air propelled by the propulsor rotor 34 across the guide vane structure 36 is directed into the turbine engine 30 and its inlet flowpath 82 through engine inlet 122. The air within the inlet flowpath 82 is further propelled (e.g., compressed) by the fan rotor 94 and directed into the core flowpath 84 and the bypass flowpath 86. The air entering the core flowpath 84 may be referred to as "core air". The air entering the bypass flowpath 86 may be referred to as "bypass air".

The core air is compressed by the LPC rotor 95 and the HPC rotor 96 and directed into a combustion chamber 138 (e.g., an annular combustion chamber) of a combustor (e.g., an annular combustor) in the combustor section 77. Fuel is injected into the combustion chamber 138 and mixed with the compressed core air to provide a fuel-air mixture. This fuel-air mixture is ignited and combustion products thereof flow through and sequentially drive rotation of the HPT rotor 97, the IPT rotor 98 and the PT rotor 99 before being exhausted from the engine core 90 into the exhaust flowpath 88. The rotation of the HPT rotor 97 and the IPT rotor 98 respectively drive rotation of the HPC rotor 96 and the LPC rotor 95 and, thus, compression of the air received from the core inlet 124. The rotation of the IPT rotor 98 also drives rotation of the fan rotor 94. This rotation of the fan rotor 94 (A) propels the core air into the core flowpath 84 and (B) propels the bypass air through the bypass flowpath 86 into the exhaust flowpath 88. The exhaust flowpath 88 subsequently directs the bypass air along with the combustion products out of the aircraft propulsion system 20 and its turbine engine 30 into the external environment 38 through the engine exhaust 136. Concurrently, the rotation of the PT rotor 99 drives rotation of the propulsor rotor 34 through the drivetrain 118. The rotation of the propulsor rotor 34 propels the ambient air within the external environment 38 across the guide vane structure 36 in the aft, downstream direction. With this arrangement, the turbine engine 30 and its engine core 90 power operation of (e.g., drive rotation of) the propulsor rotor 34 during aircraft propulsion system operation.

The heat exchange system 32 of FIG. 1 includes one or more heat exchangers 140. Each of these heat exchangers 140 may be arranged with (e.g., disposed in, project into, extend along, etc.) a respective one of the flowpath legs 134; see also FIG. 4. Each heat exchanger 140 is configured to transfer heat energy between the bypass air directed through the bypass flowpath 86 and a working fluid. Examples of the working fluid include, but are not limited to, the core air, the combustion products, lubricant, fuel, coolant, or the like. With the foregoing arrangement, the heat exchangers 140 utilize the bypass air rather than, for example, ambient air scooped from the external environment 38, to enhance heat transfer efficiency. This may be particularly useful, for example, when the aircraft is operating on ground and air movement along the aircraft propulsion system 20 may be relatively slow and low pressure. By reducing or eliminating additional air scoop(s) along an exterior of the aircraft propulsion system 20, free stream drag along the exterior of the aircraft propulsion system 20 may also be reduced. In addition, by directing the bypass air into the exhaust flowpath 88 following use with the heat exchange system 32, remaining energy from the bypass air may be recuperated to supplement thrust generated by the combustion products exhausted through the engine exhaust 136 into the exterior environment 38.

Figure 5:
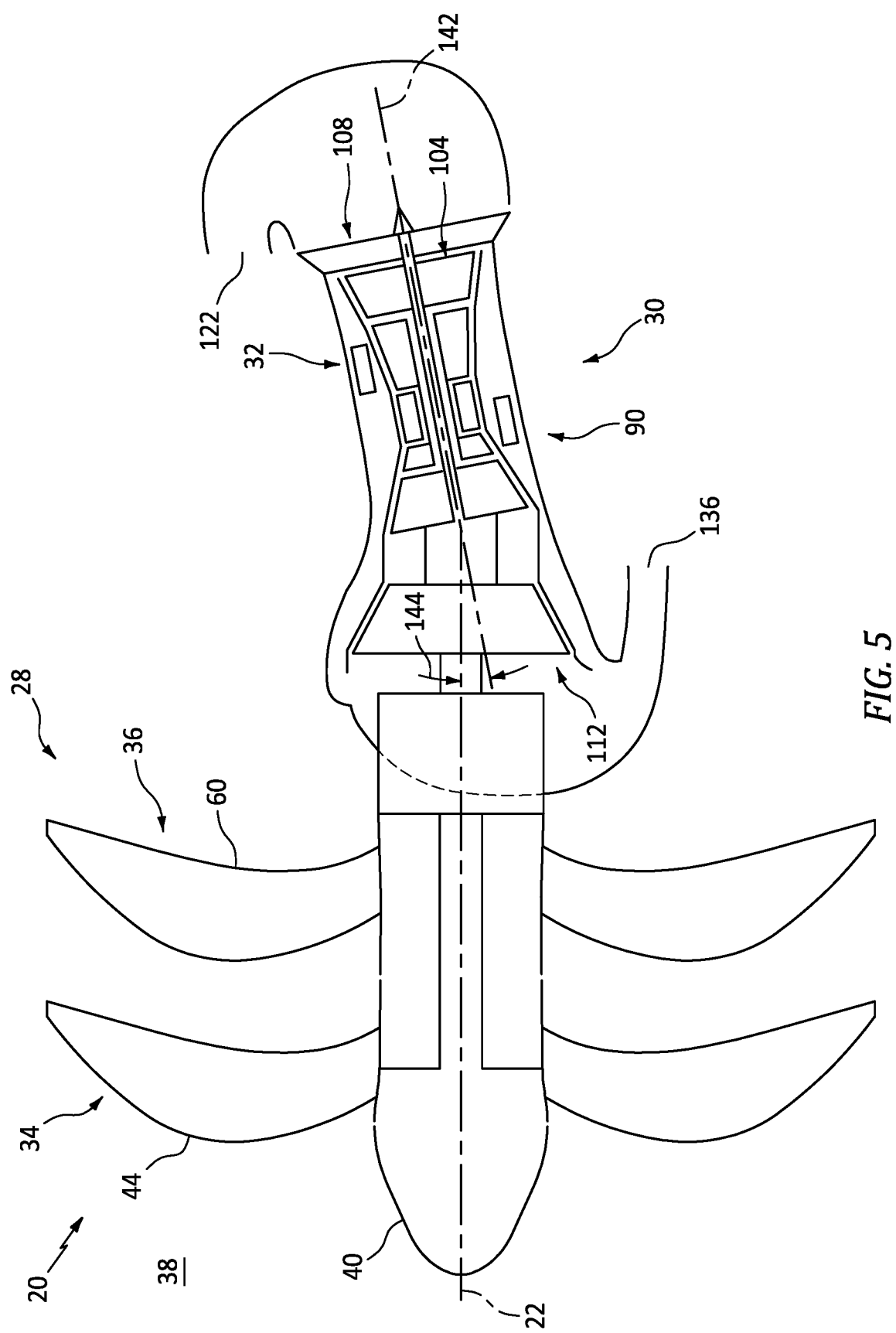
FIG. 5 is a sectional schematic illustration of the propulsion system with an angularly offset turbine engine.
Figure 6:
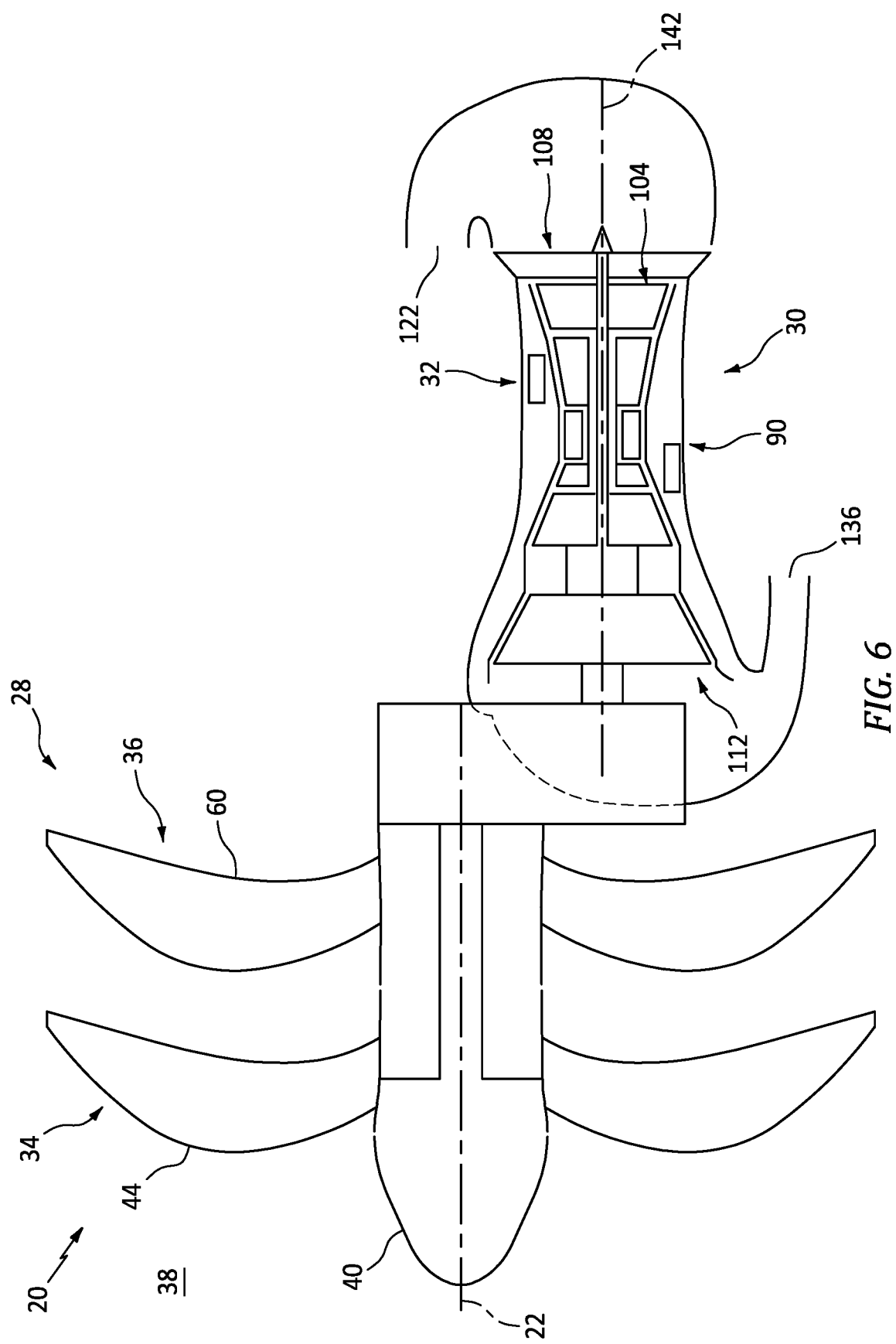
FIG. 6 is a sectional schematic illustration of the propulsion system with a radially offset turbine engine.

In some embodiments, referring to FIG. 1, the turbine engine 30 and its rotating assemblies 104, 108 and 112 may be coaxial with the propulsion module 28 and its propulsor rotating assembly 116. In other embodiments, referring to FIGS. 5 and 6, one or more rotating assemblies 104, 108 and/or 112 of the turbine engine 30 and its engine core 90 may rotate about an axis 142 which is offset from the rotational axis—the axis 22—of the propulsor rotating assembly 116. The engine axis 142 of FIG. 5, for example, is angularly offset from the propulsor axis 22 by an included angle 144. This angle 144 is a non-zero acute angle less than, for example, thirty or forty-five degrees (30-45°); e.g., between one degree (1°) and five degrees (5°), between five degrees (5°) and ten degrees (10°), between ten degrees (10°) and twenty degrees (20°), etc. Here, the engine axis 142 is coincident with the propulsor axis 22; however, the present disclosure is not limited to such an exemplary arrangement. In another example, referring to FIG. 6, the engine axis 142 (and the power turbine axis) are laterally offset (e.g., spaced from) the propulsor axis 22. The engine axis 142, however, may (or may not) be parallel with the propulsor axis 22.

The aircraft propulsion system 20 may have various turbine engine configurations other than the ones described above. For example, while the turbine engine 30 is described above with two core rotating assemblies 104 and 108, the turbine engine 30 may alternatively be configured with a single core rotating assembly (e.g., 104 or 108) or three or more core rotating assemblies. In addition, while the PT rotor 99 is described above as a free turbine rotor, it is contemplated the PT rotor 99 may alternatively be coupled to one of the core rotating assemblies 104, 108, or another compressor rotor.

Figure 8:
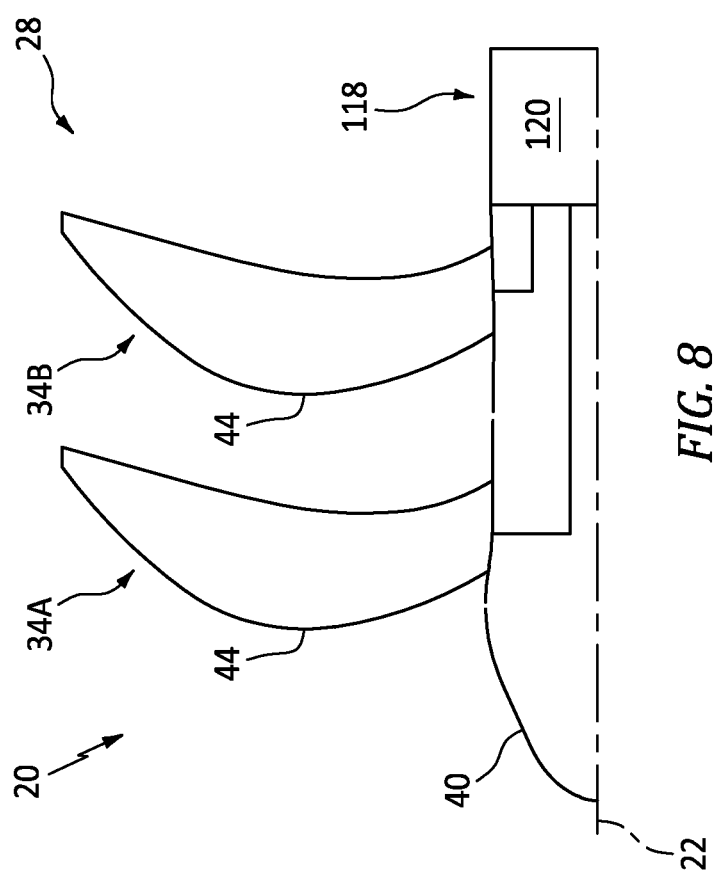
FIG. 8 is a sectional schematic illustration of a portion of the propulsion system with a multi-rotor propulsion module.
Figure 7:
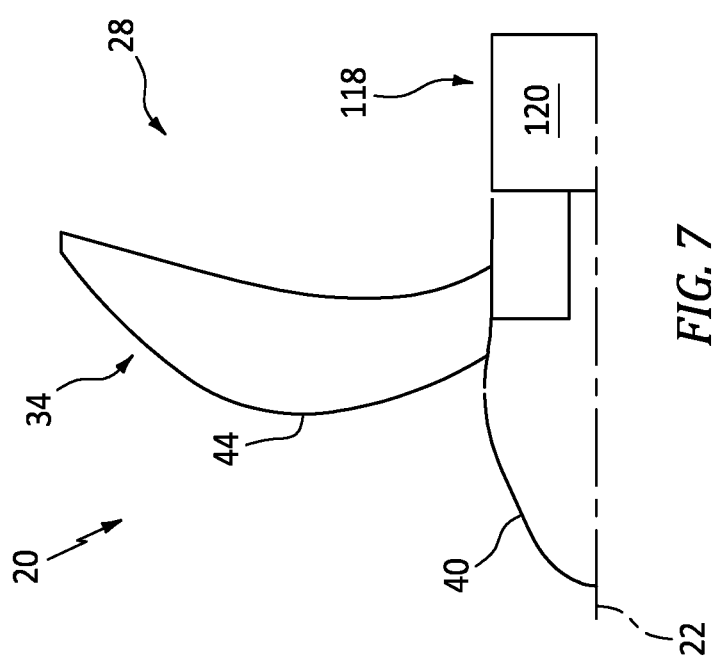
FIG. 7 is a sectional schematic illustration of a portion of the propulsion system with a single rotor propulsion module.

The aircraft propulsion system 20 may have various propulsion module configurations other than the one described above. For example, referring to FIG. 7, the propulsion module 28 may be configured with the single propulsor rotor 34 and without a guide vane structure. In another example, referring to FIG. 8, the propulsion module 28 may be configured with multiple of the propulsor rotors 34A and 34B (generally referred to as "34"); e.g., counter-rotating open propulsor rotors. Each of these propulsor rotors 34 may be rotationally driven by the turbine engine 30 and its power turbine rotating assembly 112 (see FIG. 1) through the drivetrain 118. In the dual propulsor rotor arrangement of FIG. 8, the propulsion module 28 is configured without a guide vane structure. The present disclosure therefore is not limited to the foregoing exemplary propulsor module configurations.

The aircraft propulsion system 20 is described above with a tractor configuration; e.g., where the propulsor rotor 34 is disposed at or otherwise near the propulsion system forward end 24. It is contemplated, however, the aircraft propulsion system 20 may be reversed to provide a pusher fan configuration. The present disclosure therefore is not limited to any particular open rotor propulsion system arrangement.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and embodiments and remain within the scope of the disclosure. Accordingly, the present disclosure is not to be restricted except in light of the attached claims and their equivalents.

What is claimed is:

1. A propulsion system for an aircraft, comprising:
an open propulsor rotor; and
a turbine engine configured to drive rotation of the open propulsor rotor about an axis, the turbine engine including a core flowpath, a bypass flowpath, a fan section and an engine core, and the engine core including a compressor section, a combustor section and a turbine section;
the core flowpath extending through the compressor section, the combustor section and the turbine section from an inlet into the core flowpath to an exhaust from the core flowpath, and the inlet into the core flowpath next to and downstream of the fan section;
the bypass flowpath extending outside of and along the engine core from an inlet into the bypass flowpath to an exhaust from the bypass flowpath, and the inlet into the bypass flowpath next to and downstream of the fan section; and
the engine core arranged axially between the fan section and the open propulsor rotor;
wherein the bypass flowpath includes an upstream section and a downstream section, the upstream section is annular, and the downstream section is non-annular.

2. The propulsion system of claim 1, wherein the bypass flowpath extends from the inlet into the bypass flowpath to the exhaust from the bypass flowpath in a direction axially towards the open propulsor rotor.

3. The propulsion system of claim 1, wherein the inlet into the bypass flowpath is radially outboard of the inlet into the core flowpath.

4. The propulsion system of claim 1, wherein the inlet into the core flowpath and the inlet into the bypass flowpath each comprises an annular inlet.

5. The propulsion system of claim 1, further comprising a heat exchanger disposed in the downstream section.

6. The propulsion system of claim 1, wherein
the downstream section is a first downstream section, and the bypass flowpath further includes a second downstream section;
the second downstream section is non-annular; and the first downstream section and the second downstream section are fluidly coupled in parallel to the upstream section.

7. The propulsion system of claim 6, further comprising:
a first heat exchanger arranged with the first downstream section; and
a second heat exchanger arranged with the second downstream section.

8. A propulsion system for an aircraft, comprising:
an open propulsor rotor; and
a turbine engine configured to drive rotation of the open propulsor rotor about an axis, the turbine engine including a core flowpath, a bypass flowpath, a fan section and an engine core, and the engine core including a compressor section, a combustor section and a turbine section;
the core flowpath extending through the compressor section, the combustor section and the turbine section from an inlet into the core flowpath to an exhaust from the core flowpath, and the inlet into the core flowpath next to and downstream of the fan section;
the bypass flowpath extending outside of and along the engine core from an inlet into the bypass flowpath to an exhaust from the bypass flowpath, and the inlet into the bypass flowpath next to and downstream of the fan section; and
the engine core arranged axially between the fan section and the open propulsor rotor, wherein at least one of
the turbine engine further includes an inlet flowpath fluidly coupling an inlet into the turbine engine to the core flowpath and the bypass flowpath, and; and the inlet flowpath axially reverses direction between the inlet into the turbine engine and the fan section; or
the turbine engine further includes an exhaust flowpath fluidly coupling the core flowpath and the bypass flowpath to an exhaust from the turbine engine, and the exhaust flowpath axially reverses direction between the engine core and the exhaust from the turbine engine.

9. The propulsion system of claim 1, wherein
the turbine section comprises a free power turbine rotor; and
the free power turbine rotor is coupled to and configured to drive the rotation of the open propulsor rotor.

10. The propulsion system of claim 9, further comprising a geartrain coupling the free power turbine rotor to the open propulsor rotor.

11. The propulsion system of claim 9, wherein the free power turbine rotor is rotatable about the axis.

12. The propulsion system of claim 9, wherein the axis is a first axis, and the free power turbine rotor is rotatable about a second axis that is offset from the first axis.

13. The propulsion system of claim 1, wherein the engine core comprises a rotating assembly rotatable about the axis; and
the rotating assembly includes a compressor rotor, a turbine rotor and a shaft coupling the turbine rotor to the compressor rotor, the compressor rotor is in the compressor section, and the turbine rotor is in the turbine section.

14. The propulsion system of claim 1, wherein
the axis is a first axis, and the engine core comprises a rotating assembly rotatable about a second axis offset from the first axis; and
the rotating assembly includes a compressor rotor, a turbine rotor and a shaft coupling the turbine rotor to the compressor rotor, the compressor rotor is in the compressor section, and the turbine rotor is in the turbine section.

15. The propulsion system of claim 1, further comprising an open guide vane structure downstream of the open propulsor rotor, the open guide vane structure configured to condition air propelled by the open propulsor rotor.

16. The propulsion system of claim 1, further comprising:
a second open propulsor rotor;
the turbine engine configured to drive rotation of the second open propulsor rotor about the axis.

17. A propulsion system for an aircraft, comprising:
an open propulsor rotor;
a turbine engine configured to drive rotation of the open propulsor rotor about an axis, the turbine engine including a core flowpath, a bypass flowpath, an exhaust flowpath, a fan section and an engine core, and the engine core including a compressor section, a combustor section and a turbine section;
the core flowpath extending through the compressor section, the combustor section and the turbine section from an inlet into the core flowpath to an exhaust from the core flowpath, and the inlet into the core flowpath downstream of the fan section;
the bypass flowpath extending from an inlet into the bypass flowpath to an exhaust from the bypass flowpath, and the inlet into the bypass flowpath downstream of the fan section, wherein the inlet into the bypass flowpath is annular; and
the exhaust flowpath fluidly coupling the core flowpath and the bypass flowpath to an exhaust from the turbine engine, wherein the inlet into the core flowpath is located axially aft of the exhaust flowpath.

18. The propulsion system of claim 17, wherein the inlet into the bypass flowpath is radially outboard of and circumscribes the inlet into the core flowpath.

19. The propulsion system of claim 17, wherein the fan section comprises a fan rotor radially overlapping the inlet into the bypass flowpath and the inlet into the core flowpath.

* * * * *